Figure 1:
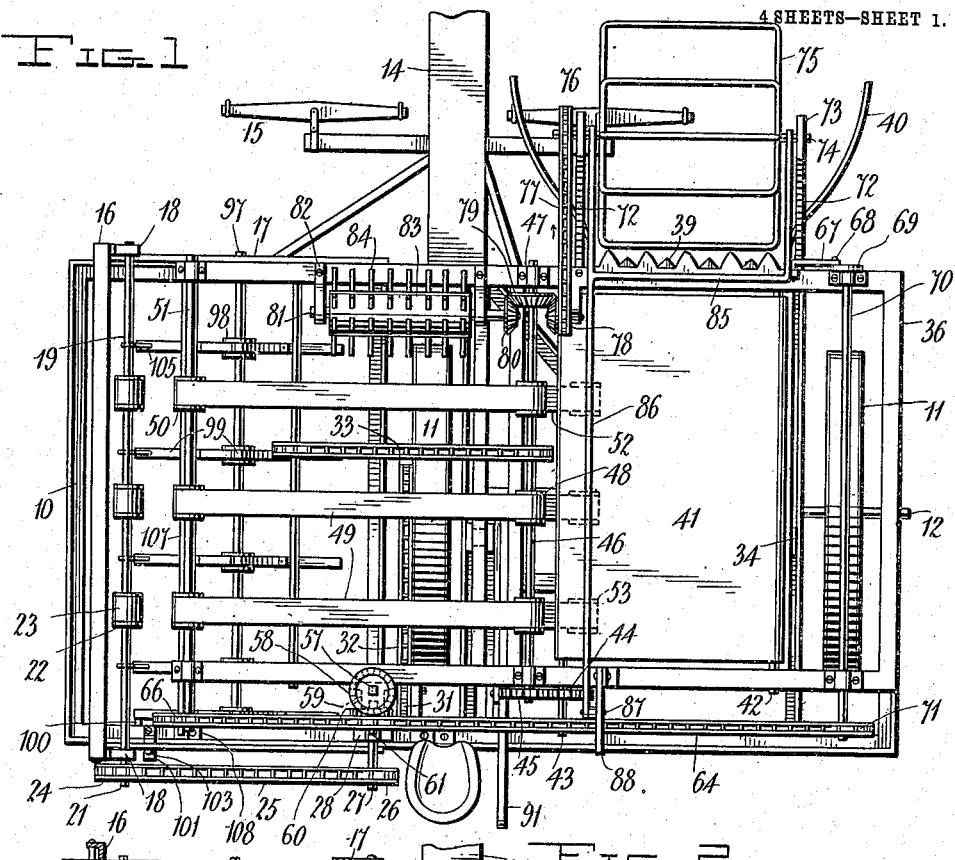

H. L. TONKINSON.
BROOM CORN HEADER.
APPLICATION FILED AUG. 13, 1908.

930,438.

Patented Aug. 10, 1909.
4 SHEETS—SHEET 1.

Witnesses

Inventor
Harry L. Tonkinson
By Chandler & Chandler
Attorneys

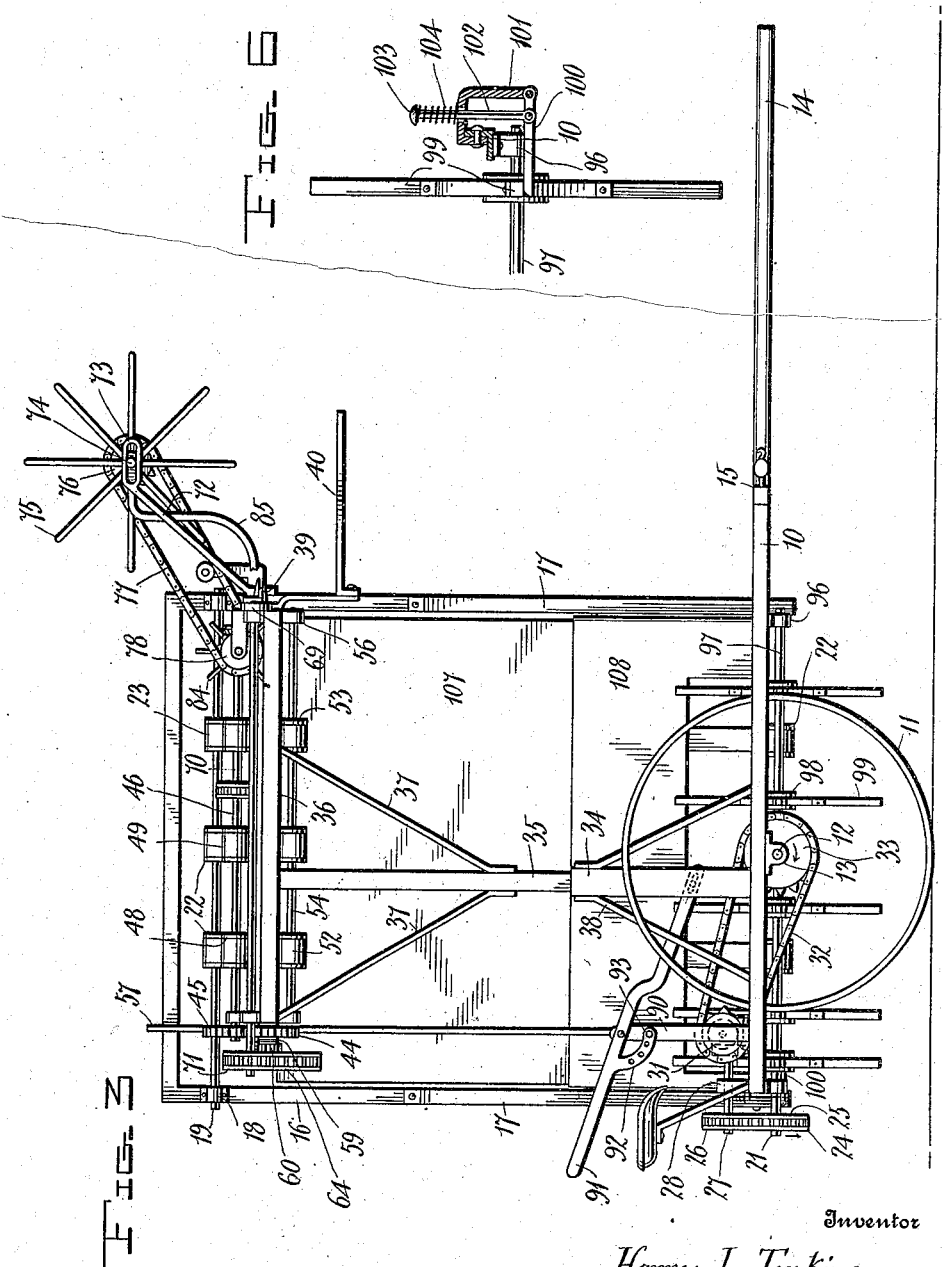

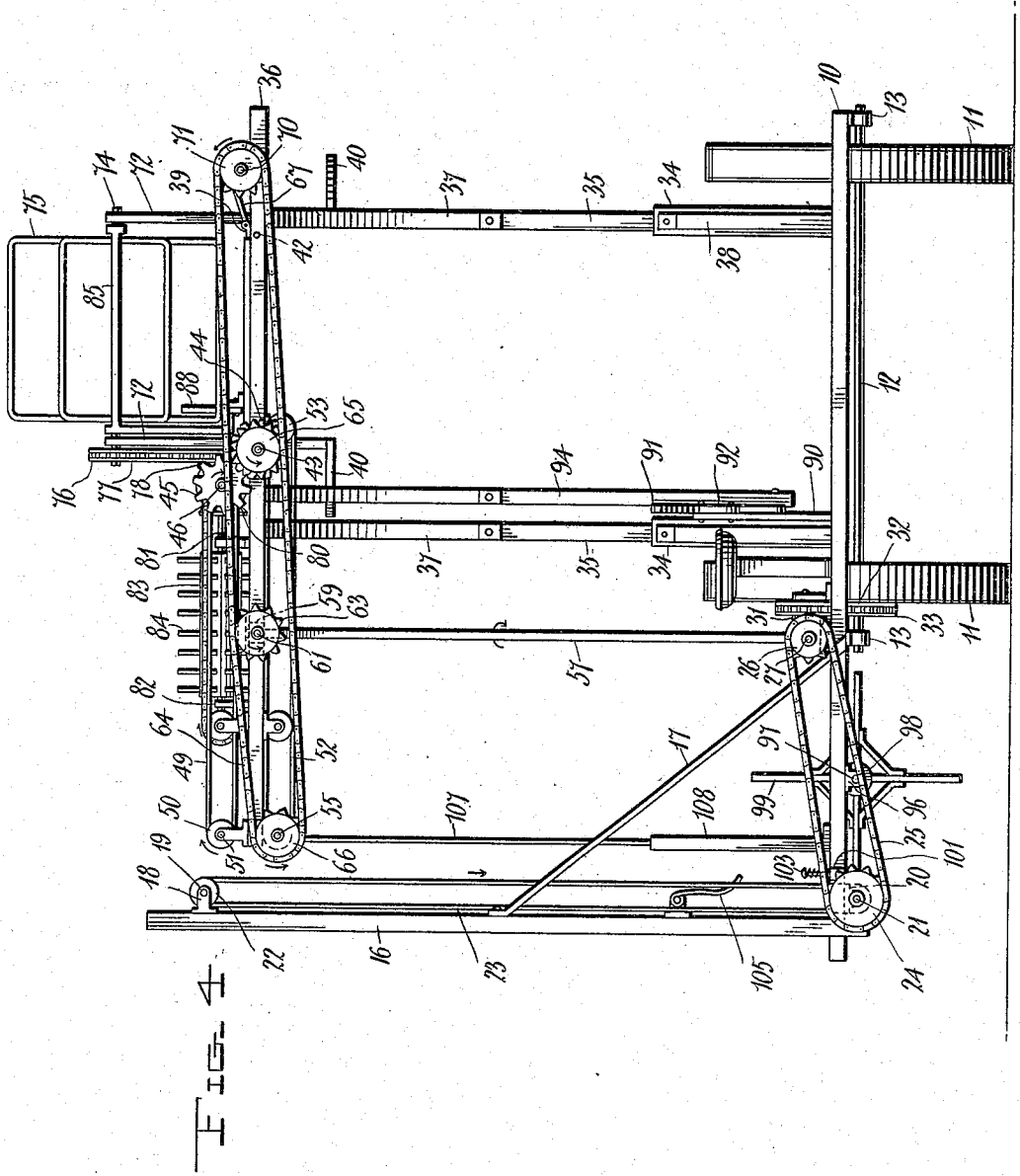

H. L. TONKINSON.
BROOM CORN HEADER.
APPLICATION FILED AUG. 13, 1908.
930,438.
Patented Aug. 10, 1909.
4 SHEETS—SHEET 4.
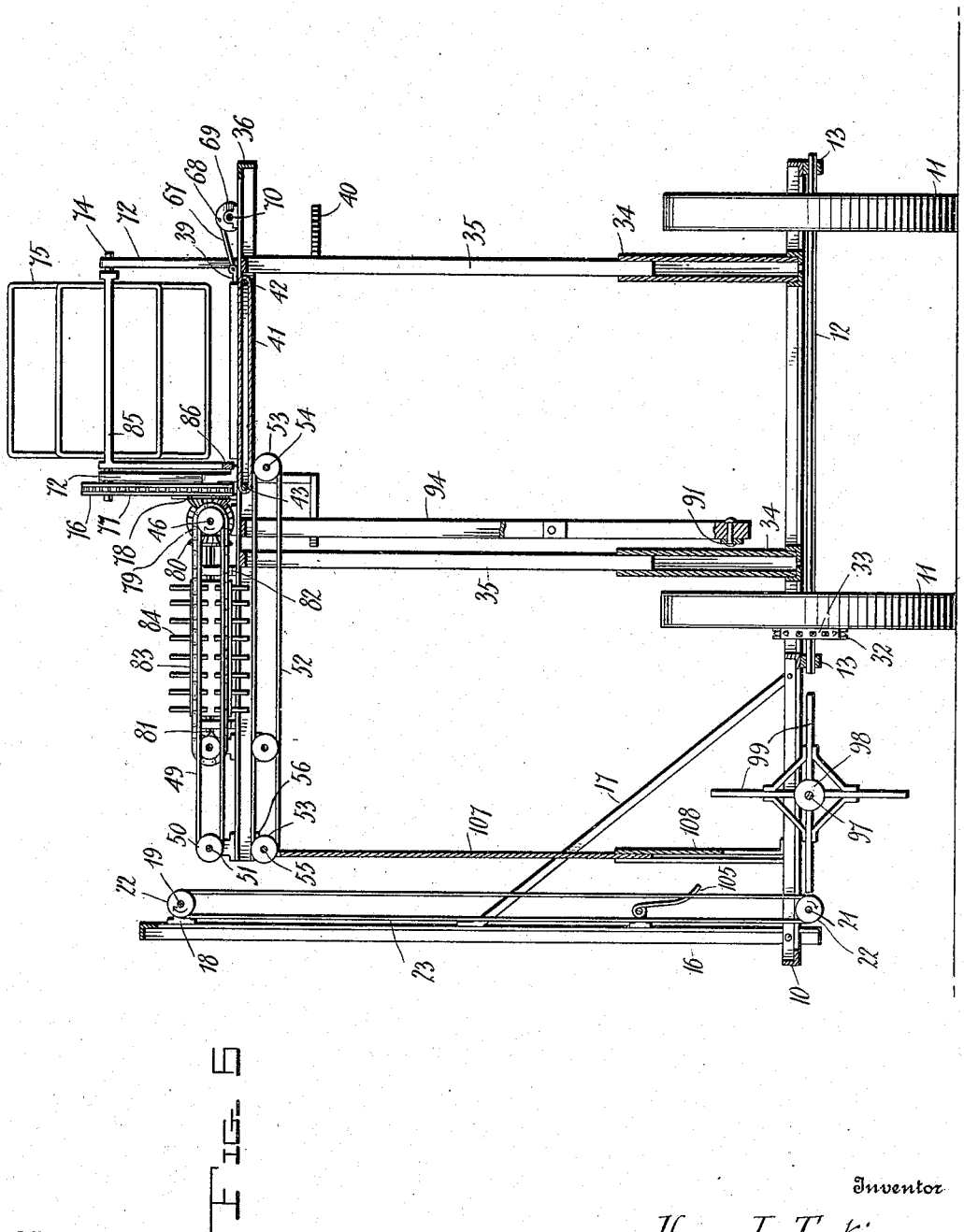
Witnesses
Inventor
Harry L. Tonkinson
By Chandler & Chandler
Attorneys

UNITED STATES PATENT OFFICE.

HARRY L. TONKINSON, OF GABLE, OKLAHOMA.

BROOM-CORN HEADER.

No. 930,438. Specification of Letters Patent. Patented Aug. 10, 1909.

Application filed August 13, 1908. Serial No. 448,391.

*To all whom it may concern:*

Be it known that I, HARRY L. TONKINSON, a citizen of the United States, residing at Gable, in the county of Texas, State of Oklahoma, have invented certain new and useful Improvements in Broom-Corn Headers; and I do hereby declare the following to be a full, clear, and exact description of the invention, such as will enable others skilled in the art to which it appertains to make and use the same.

The invention relates to a broom corn header and more particularly to a machine for stripping the heads from stalks of a crop of broom corn.

The primary object of the invention is the provision of a broom corn header comprising a wheeled main frame having superposed upon the same an adjustable supplemental frame, the said main frame carrying a bunch delivery wheel, a vertically disposed conveyer for delivering material to the said bunch delivery wheel and the superposed supplemental frame having at its front a sickle cutter to cut the heads from the stalks of the broom corn, means for shifting the severed material onto a conveyer, which latter delivers the same between upper and lower conveyer belts where it is transported to the vertically disposed conveyer on the main frame downwardly to the bunch delivery wheel.

Another object of the invention is the provision of a broom corn header comprising a wheeled main frame having mounted thereon a superposed frame the latter supporting cutter mechanism for severing the heads from broom corn, conveyer mechanism for receiving the severed material and transporting the same over the supplemental frame to one side thereof where it is carried downwardly on to a delivery mechanism supported by the main frame which delivery mechanism will deposit the severed material in bunches upon the ground during the travel of the machine and mechanism actuated by the wheels of the vehicle to impart movement to the cutter and conveyer mechanisms.

With these and other objects in view the invention for example is carried into practice and executed by the construction which will be hereinafter more fully described and as illustrated in the accompanying drawings which disclose the preferred form of embodiment of the invention. It is to be understood, however, that changes, variations and modifications may be made such as come properly within the scope of the claims hereunto appended without departing from the spirit of the invention.

Figure 2:
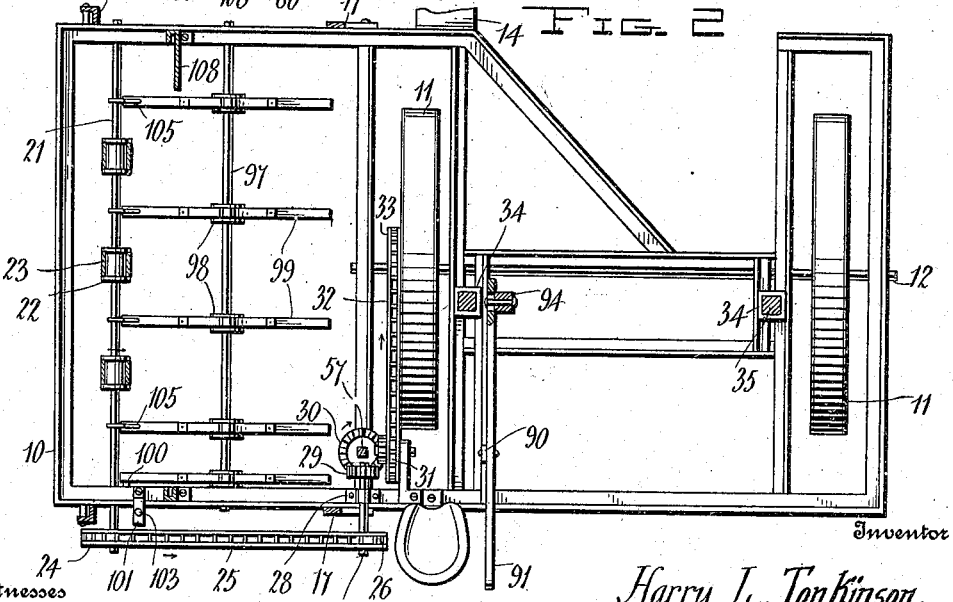

In the drawings: Figure 1 is a top plan view of the machine. Fig. 2 is a horizontal sectional view. Fig. 3 is a side view. Fig. 4 is a rear end view. Fig. 5 is a vertical sectional view taken centrally of the machine. Fig. 6 is a fragmentary view partly in section of a portion of the bunch delivery wheel and its trip mechanism.

Similar reference characters indicate corresponding parts throughout the several views in the drawings.

In the drawings the numeral 10 designates generally the main frame of the machine which is mounted upon traction wheels 11 fixed to an axle 12 journaled in bearings 13 depending from the said main frame and projecting from the front or forward end of said main frame is a tongue 14 having the usual or ordinary double tree 15 for the adjustment of the draft animals whereby the machine can be transported over a field in the execution of its work.

Fixed to the main frame at one end thereof is a vertically disposed frame 16 the same being rigidly held in position by brace members 17 connected to the same and to the main frame. Near the top of the vertical frame and mounted in bearings 18 is a horizontally disposed rotatable shaft 19 and mounted in bearings 20 depending from the main frame is a horizontally disposed rotatable shaft 21 and each of which shafts 19 and 21 respectively have fixed thereto flanged belt pulleys 22 spaced from each other and over which are trained conveyer belts 23 the latter adapted to move downwardly and receive their motion from a sprocket wheel 24 fixed to the shaft 21 at one end thereof and over which is trained a sprocket chain 25 which latter is also trained over a sprocket wheel 26 fixed to a stud shaft 27 rotatably mounted in a bearing 28 and carries a gear 29 in mesh with a gear 30 the latter meshing with a combined gear and sprocket wheel 31 which latter has trained thereover a sprocket chain 32 the same also trained over a sprocket wheel 33 fixed to the rotatable axle 12 actuated by the traction wheels of the machine.

Centrally of the main frame and fixed thereto in spaced relation are vertically disposed boxings or sleeves 34 into which telescope vertical standards 35 the same supporting a horizontally disposed supplemental superposed frame 36 which is held in a rigid position by the angle brace bars 37 connected thereto and to the said standards. The boxings or sleeves 34 also are supported and held rigid by brace bars 38 which are connected to the main frame and said boxings.

Mounted upon the supplemental frame 36 at its front near one end thereof is a reciprocating sickle blade 39 which is adapted to sever or cut the heads from the stalks upon the advance of the machine and such stalks are guided to the sickle blade by outwardly diverging curved guide arms 40.

Mounted in the supplemental frame 36 directly in rear of the sickle blade 39 is an endless transversely movable conveyer 41 the same being trained over shafts 42 and 43 which latter shaft has fixed thereto a cog gear 44 in mesh with a cog gear 45 carried by the end of a shaft 46 journaled as at 47 on the supplemental frame and a distance above the conveyer 41 and upon the said shaft 46 are flanged belt pulleys 48 over which are trained endless belts 49 forming conveyers which latter are also trained over corresponding belt pulleys 50 mounted upon a shaft 51 journaled upon the supplemental frame adjacent the conveyer 23 supported upon the main frame. Below the belts 49 and spaced a suitable distance therefrom are conveyer belts 52 the latter trained over flanged belt pulleys 53 which are fixed to shafts 54 and 55 journaled in bearings 56 mounted upon the supplemental frame.

Projecting upwardly vertically from the main frame and actuated by the gear 30 is a squared rotatable driven shaft 57 the upper end of which slidably engages a gear 58 rotatable therewith and mounted upon a bracket 59 on the supplemental frame. The gear 59 meshes with a gear 60 fixed to a rotatable stud shaft 61 journaled in the frame and which latter shaft carries a sprocket wheel 63 over which is trained a sprocket chain 64 which latter actuates a sprocket wheel 65 mounted upon the shaft 43 to impart movement to the conveyer 41 as the machine advances over a field. Said sprocket chain 64 is also trained over a sprocket wheel 66 mounted upon the end of the shaft 55 to impart movement to the lower belts 52 which latter move with the upper belts 49 which receive their motion through the medium of the cog wheel 45 driven by the shaft 43 so that the severed heads upon the conveyer 41 will be transferred between the belts 49 and 52 and carried across the supplemental frame to the downwardly moving conveyer 23 of the main frame.

Connected to the sickle blade 39 is a link rod 67 the same being eccentrically mounted as at 68 to a rotatable disk 69 fixed to a driven shaft 70 the latter having at its opposite end a sprocket wheel 71 over which is trained the sprocket chain 64 so that reciprocating motion or movement can be imparted to the sickle blade whereby the same will sever the heads from the standing stalks of the crop in a field.

Projecting outwardly from the supplemental frame 36 are upwardly inclined brackets 72 arranged in spaced relation on opposite sides of the sickle blade 39 and terminating in slotted ends 73 in which is mounted an adjustable shaft 74 supporting a rotatable reel 75 above said sickle blade and is adapted to act upon the severed material cut by the sickle blade to cause the said material to fall upon the conveyer 41 and the said reel 75 is driven by a sprocket wheel 76 over which is driven a sprocket chain 77 the latter trained over a combined sprocket wheel and gear 78 which latter is in mesh with a gear 79 fixed to the shaft 46 mounted in the supplemental frame. In mesh with the said gear 79 is a gear 80 fixed to a shaft 81 journaled in bearings 82 secured to the front end of the supplemental frame and which shaft 81 carries a stripper roller 83 having stripper blades 84 mounted peripherally of the roller and arranged in spaced rows which blades 84 are adapted to strip blades or boots from the severed stalks as they are conveyed by the endless belts 49 and 52 between the same to the vertical conveyer 23 on the main frame.

To adjust the reel 75 in proximity and away from the sickle blade 39 there is provided a forked member 85 connected to the shaft 74 of said reel and having a rearwardly extending arm or rod 86, the rearmost end of which is pivotally connected as at 87 to a throw lever 88 to be actuated by the operator of the machine.

Rising from the main frame 10 and under the superposed frame is an upright 90 to which is pivotally connected a manually operable throw lever 91 having a drop curve as at 92 engaging a pin 93 projecting from the upright bar and said lever has connection with a depending bar 94 braced at the middle of the superposed frame on its under side and which throw lever is adapted to raise and lower the supplemental frame 36 which latter is held in its adjusted position by the locking pin 93 detachable from the said upright on the main frame Journaled in bearings 96 on the main frame is a bunch delivery or dropper means comprising a rotatable shaft 97 horizontally disposed in the main frame adjacent the conveyer 23 and having spaced hubs 98 with radially projecting arms 99 which support a bunch of material collected from the downwardly moving conveyer 23 and which material is delivered periodically in bunches to the ground. To hold the bunch delivery means against movement until a predetermined amount of material has been cut thereby to form a bunch there is provided a trip lever 100 which is arranged in the path of the arms to engage the same as the delivery means rotate. The said trip arm 100 is pivoted to a boxing 101 mounted upon the main frame in which works a pivotal stem 102 connected to said trip arm and terminating in an enlarged head 103 which has its bearing against one end of a tension spring 104 the opposite end of the latter having its bearing against said boxing 101 and which spring serves to support and hold the trip arm 100 in a position to engage an arm 99 so as to hold the bunch delivery mechanism against rotation until a predetermined amount of severed material has been cut by the said arms to overcome the tension of the spring 104 to disengage the trip arm 100 from the arm of the bunch delivery mechanism whereby the latter will by gravitation gather the bunch of material to the ground.

To deflect the material from the conveyer 23 so that the said material will be caught by the bunch delivery wheel there are provided spring fingers 105 secured to the vertical frame and extending downwardly at an inclination beyond the conveyer 23 so that the severed material will be positively transferred to the bunch delivery means.

Adjacent the vertical conveyer 23 is a shield plate 107 depending from the supplemental frame 36 and telescoping between spaced guide plates 108 mounted upon the main frame and which shield plate serves to accumulate the severed material being carried downwardly by the conveyer 23 to be delivered to the bunch delivery means on the main frame of the machine.

What is claimed is—

1. A machine of the class described comprising a wheeled main frame, a superposed frame thereon, means for raising and lowering the said superposed frame, a reciprocating cutter means carried by the superposed frame, conveyer mechanism mounted upon the latter and a bunch delivery means on the main frame to receive material from the conveyer mechanism.

2. In a machine of the class described, a wheeled main frame, an adjustable superposed frame thereon, cutter means carried by the latter frame, vertically disposed conveyer means on the main frame, bunch delivery mechanism adjacent to the vertical conveyer, and conveyer mechanism supported upon the superposed frame.

3. In a machine of the class described, a wheeled main frame, an adjustable superposed frame thereon, cutter means carried by the latter frame, vertically disposed conveyer means on the main frame, bunch delivery mechanism adjacent to the vertical conveyer, conveyer mechanism supported upon the superposed frame, and mechanism actuated by the wheels of the main frame to impart motion to the conveyer mechanism and cutter means.

4. In a machine of the class described, a wheeled main frame, a superposed supplemental frame mounted on the same, cutter means carried by the latter frame, conveyer means in rear of the cutter means, upper and lower endless belt conveyers to receive material from the said conveyer means, vertically disposed conveyer mechanism supported by the main frame and bunch delivery means adjacent the latter conveyer mechanism to receive material therefrom.

5. In a machine of the class described, a main frame, a bunch delivery means mounted in the main frame, conveyer mechanism upon said main frame adjacent the bunch delivery means, a superposed frame on the main frame, means for raising and lowering said superposed frame, a cutter at the front and near one end of said superposed frame, an endless conveyer in rear of said cutter to receive the severed material therefrom, spaced conveyer belts at one end of the conveyer to receive material from the latter and to transfer the same to the conveyer mechanism on the main frame, and a shield plate depending from the superposed frame and adjacent the conveyer mechanism on the main frame.

In testimony whereof, I affix my signature in presence of two witnesses.

HARRY L. TONKINSON.

Witnesses:
P. E. TONKINSON,
JOSEPH PAUL.